(12) United States Patent
Hirose et al.

(10) Patent No.: US 7,712,992 B2
(45) Date of Patent: May 11, 2010

(54) MEMBER MOUNTING STRUCTURE

(75) Inventors: Masamori Hirose, Toyota (JP);
Fumihiko Okada, Toyota (JP); Naoki Hirose, Kariya (JP)

(73) Assignees: Toyoda Iron Works Co., Ltd., Toyota-shi, Aichi-ken (JP); Toyota Boshoku Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 12/000,277

(22) Filed: Dec. 11, 2007

(65) Prior Publication Data

US 2008/0317545 A1    Dec. 25, 2008

(30) Foreign Application Priority Data

Jun. 22, 2007    (JP) .............................. 2007-165651

(51) Int. Cl.
*F16B 9/00*    (2006.01)
(52) U.S. Cl. ..................................... 403/168; 403/408.1
(58) Field of Classification Search ................ 403/167, 403/168, 408.1; 296/1.08, 146.7, 191
See application file for complete search history.

(56) References Cited

U.S. PATENT DOCUMENTS 6,273,207 B1 *   8/2001   Brown .......................... 180/219
6,471,051 B2 *  10/2002   Marsetti et al. ............. 403/167
7,256,745 B2 *   8/2007   Saito et al. ................... 343/713
7,428,122 B2 *   9/2008   Kimura et al. ........... 403/408.1

FOREIGN PATENT DOCUMENTS

JP           244106       3/1990
JP         3056937 U     12/1998

OTHER PUBLICATIONS

Office Action for Japanese Patent Application No. 2007-165651, mailed on May 19, 2009 (2 pages).

* cited by examiner

*Primary Examiner*—Michael P Ferguson
(74) *Attorney, Agent, or Firm*—Finnegan, Henderson, Farabow, Garrett & Dunner, LLP

(57) ABSTRACT

A mounting part (second member) 12 has a positioning hole 26 to be fitted to an outer peripheral side of a boss 18 disposed on a vehicle interior part (first member) 10, to be positioned thereto. A facing surface 24 of the mounting part 12 is formed into a flat surface. By a slidable-contact of the flat facing surface 24 with a tip end of the boss 18 for a positional alignment, the positioning hole 26 can be fitted readily to the boss 18. A tubular portion 28 is disposed on a surface at a side opposite to the facing surface 24 to be fitted to the boss 18 substantially over its entire length thereof. Such fitting maintains the aligned state, so that a fastening work during fixing of the mounting part 12 by screwing a mounting screw 30 into a cylindrical hole 16 of the boss 18 is facilitated.

7 Claims, 6 Drawing Sheets

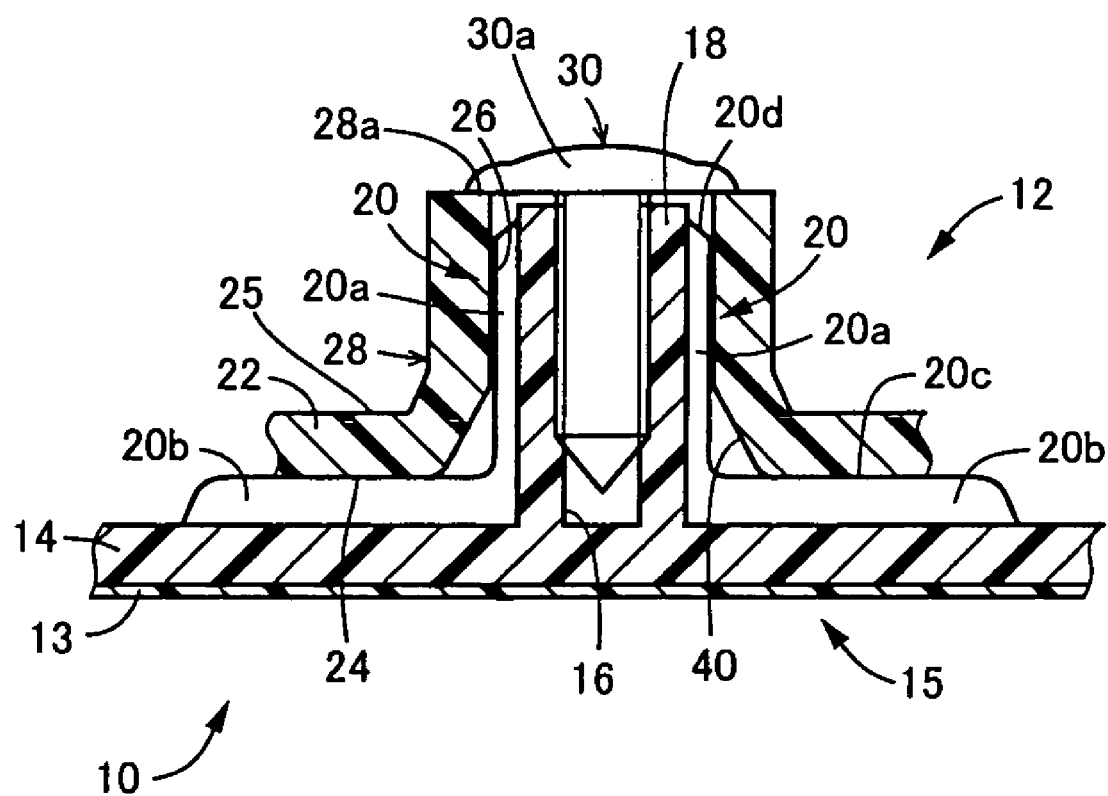

Prior Art

Prior Art

MEMBER MOUNTING STRUCTURE

The present application is based on Japanese Patent Application No. 2007-165651, and content thereof is incorporated herein.

BACKGROUND OF THE INVENTION

1. Field of the Invention

The present invention relates to a member mounting structure and particularly relates to an improvement of a mounting structure, which with positioning a second member by a boss disposed on a first member, fixes a second member to the first member integrally by a mounting screw.

2. Description of the Prior Art

A mounting structure is known which presses a second member against a first member and integrally fixes it thereto. That is, in a state where a predetermined second member is positioned relative to a first member having a tubular boss with a screw fastening hole at its center using the boss as a reference, a mounting screw is screwed into the screw fastening hole. Thus, the second member is pressed against the first member and is thereby fixed integrally thereto by a head of the mounting screw.

A parts mounting apparatus disclosed in Patent Document 1 (Japanese Published Utility Model Application No. H 02-44106) is an example of such a structure. As shown in FIG. 5, a clock 102 is mounted integrally as a second member to a center cluster 10 which is an interior part for a vehicle as a first member. FIG. 5A is a longitudinal sectional view of mounting portions, and FIG. 5B is a perspective view of a supporting portion 120 as viewed from side of a positioning tube portion 124.

In FIG. 5, on a rear surface (upper surface in FIG. 5A) of the center cluster 100, a boss 106 of cylindrical shape having a screw fastening hole 108 at its center is protruded integrally at a periphery of a window hole 104. Four reinforcing ribs 110 are disposed radially on an outer peripheral surface of the boss 106. Meanwhile, the clock 102 has a supporting portion 120 in correspondence to the boss 106, on which a penetrating hole 122 is formed in correspondence to the screw fastening hole 108. At a circumference of the penetrating hole 122, a cylindrical positioning tubular portion 124 to be fitted to an outer peripheral side, that is fitted radially outward of the boss 106 protruding toward the center cluster 100, is provided. The positioning tubular portion 124 has four slits 126 provided for avoiding interference with the reinforcing ribs 110.

The clock 102 is positioned relative to the center cluster 100 so that the positioning tubular portion 124 is fitted to the outer peripheral side i.e. outer peripheral surface of the boss 106. In this state, a tapping screw 128 is screwed into the screw fastening hole 108 through the penetrating hole 122. The tapping screw 128 is thereby screwed to the screw fastening hole 108 while tapping an internal thread thereon, so that a head of the tapping screw 128 presses the supporting portion 120 against a tip surface of the boss 106 and thereby fixes it thereto integrally. Here, because the cylindrical boss 106 and the positioning tubular portion 124 are mutually fitted over a predetermined length, the positioning of the clock 102 is maintained satisfactorily, so that a fastening work by the tapping screw 128 can be performed readily.

FIG. 6 is a sectional view showing another conventional example. On a first member 130 which is a vehicle interior part, etc., a cylindrical boss 134 having a threaded hole 132 as a screw fastening hole at its center and protruding integrally is provided. On an outer peripheral surface of the boss 134, a plurality of reinforcing ribs 136 are disposed radially except for a predetermined axial length at a tip portion of the boss 134.

Meanwhile, a second member 140 is provided with a positioning hole 142 fitted to the outer peripheral side of the boss 134 to be positioned. The second member 140 has a thickness which is greater than the protruding dimension of the boss 134 from the reinforcing ribs 136. With the boss 134 fitted in the positioning hole 142 and the second member 140 contacted with reinforcing ribs 136, a mounting screw 144 is screwed into the threaded hole 132 of the boss 134. In this way, a head of the mounting screw 144 presses the second member 140 against the reinforcing ribs 136 to fix it integrally to the first member 130.

However, in the mounting structure of FIG. 5, because the boss 106 and the positioning tube portion 124 which are to be fitted mutually are disposed in a confronting manner, they must be positionally aligned in a mutually separated state before fitted together. This aligning process is troublesome, which hinders a good mounting workability and makes an automation of the mounting work difficult.

Also, unless the slits 126 formed in the positioning tube portion 124 and the reinforcing ribs 110 are aligned in positions thereof, the boss 106 and the positioning tube portion 124 cannot be fitted together. This also worsens an aligning workability as well.

Meanwhile, in the mounting structure of FIG. 6, the second member 140 is provided with the positioning hole 142. By adjusting position of the second member 140 with slidable-contacting with the tip end of the boss 134, the positioning hole 142 can be fitted readily to the boss 134. However, because the fitting length is less than thickness of the second member 140, there is a fear that the second member 140 may be detached or disengaged readily. In order to prevent such detachment, the fastening work of the mounting screw 144 must be performed while pressing the second member 140, which results in poor mounting workability. In this case, to improve the mounting workability, a positioning boss and a positioning hole must be provided additionally. Also, when the mounting screw 144 is fastened while the second member 140 rides on the boss 143, defective mounting structure is produced to worsen a yield.

SUMMARY OF THE INVENTION

The present invention has been made with the above circumstances as a background, and has its object to provide a mounting structure which is excellent in a mounting workability, in which a second member can be positioned readily using a boss provided on a first member as a reference, and owing to properly maintained positioned state a fastening work of a mounting screw is performed readily.

For achieving the above object, a first aspect of the present invention is featured by, in a member mounting structure, in which in a state where a predetermined second member is positioned relative to a first member having a tubular boss with a screw fastening hole at a center thereof using the boss as a reference, a mounting screw is screwed into the screw fastening hole such that a head of the mounting screw presses and integrally fixes the second member against and to the first member, that (a) the second member is provided with a positioning hole extending axially and being fitted to an outer peripheral side of the boss to be positioned relative to the boss; and (b) the second member has at a side facing with the first member a flat facing surface at a periphery of the positioning hole, and has on a surface opposite side to the flat facing surface a tubular portion extending axially and being provided with the positioning hole continuing from the flat facing surface, (c) wherein with the tubular portion fitted to the boss, the mounting screw is screwed into the screw fastening hole of the boss to be engaged with a tip end of the tubular portion at the head thereof, so that the second member is integrally fixed to the first member.

A second aspect of the present invention is featured by, in the member mounting structure of the first invention, that (a) the positioning hole is formed to penetrate through the tubular portion, the tubular portion is fitted to the boss to be contacted with the first member at the flat facing surface thereof, and the tubular portion is axially protruded from the boss, and (b) the mounting screw is screwed into the screw fastening hole of the boss to be engaged with the tip end surface of the tubular portion at the head thereof, and the flat facing surface is pressed against the first member so that the second member is integrally fixed to the first member.

A third aspect of the present invention is featured by, in the member mounting structure of the first invention or second invention, that the positioning hole has an inclined surface of which inner wall surface is inclined toward a center line i.e. radially inwardly as it goes from a side of the flat facing surface to a side of the tip end of the tubular portion.

A fourth aspect of the present invention is featured by, in the member mounting structure of one of the first invention to third invention, that a plurality of reinforcing ribs are disposed axially on the outer peripheral surface of the boss, and the positioning hole is fitted to an outer peripheral side of the plurality of reinforcing ribs.

A fifth aspect of the present invention is featured by, in the member mounting structure of one of the first invention to fourth invention, that (a) the first member is a vehicle interior part having a resin base member, from a rear surface of which the boss is axially protruded integrally, and (b) the second member is a mounting part made of resin to be mounted to the vehicle interior part from which the tubular portion is axially protruded integrally.

In the member mounting structure according to the first aspect of the present invention, the second member is provided with the positioning hole fitted to the outer peripheral side of the boss to be positioned relative thereto. The facing surface of the second member which faces with the first member is formed into a flat surface. Thus, by performing mutual positional alignment with the flat facing surface slidably-contacted with the tip end of the boss, the positioning hole can be fitted to the boss to be positioned relative thereto readily.

Also, on the surface opposite side to the flat facing surface, the tubular portion is disposed to be fitted to the boss, in other words, the positioning hole disposed at the tubular portion and the boss are fitted together. The positioned state is maintained well by the fitting between the tubular portion and the boss. Consequently, the fastening work of screwing the mounting screw into the screw fastening hole of the boss can be performed readily and rapidly, so that the second member is integrally fixed to the first member. Because positional alignment (positional adjustment) can be performed readily, and the fastening work of the mounting screw can be performed readily, so that the member mounting work can be automated.

Meanwhile, because of the fitting between the boss and the tubular portion, firstly, fastening the mounting screw with the second member ridden on the boss becomes difficult, thus preventing occurrence of the defective production to thereby improve the yield. Secondly, as long as the boss is partially located within the positioning hole, the tubular portion is completely fitted to the boss and is fixed thereto at the predetermined position as the mounting screw is screwed, a high mounting position precision (aligning quality) is always obtained, regardless of deformation, positional deviation, etc., of the respective portions.

In the second aspect of the present invention, the positioning hole is formed to penetrate through the tubular portion. In addition, by the fitting of the tubular portion to the boss, the flat facing surface is brought into contact with the first member, and the mounting screw is screwed into the screw fastening hole of the boss in this state. Because the head of the mounting screw engages with the tip end surface of the tubular portion to press and to fix the flat facing surface against and to the first member, visual recognition of the screw fastening hole is facilitated. Thus, the screw fastening work can be performed more readily. Also, the second member is simple in the structure, can be arranged inexpensively, and can be made of the resin as in the fifth aspect of the present invention.

In the third aspect of the present invention, the positioning hole has an inclined surface of which inner wall surface is inclined toward a center line as it goes from the side of the flat facing surface to the side of the tip end of the tubular portion. The area of the opening at side of the flat facing surface is made large, and the aligning work during fitting of the positioning hole relative to the boss is facilitated further. Also, the play existed between the boss and the positioning hole is selected small, so that the aligning of them can be performed at high precision. Thus, the mounting positioning precision of the second member relative to the first member can be improved further.

In the fourth aspect of the present invention, the plurality of reinforcing ribs are disposed axially on the outer peripheral surface of the boss, and the positioning hole of the second member is fitted to the outer peripheral side of the plurality of reinforcing ribs. Therefore, the aligning of slits, which was necessary in FIG. 5, is not necessary in the present invention. The positioning hole can be fitted readily relative to the boss to perform positioning regardless of the presence/absence of the reinforcing ribs. In addition, the reinforcing ribs can secure a predetermined strength at the periphery of the boss and the positioning hole.

BEST MODE FOR CARRYING OUT THE INVENTION

The first member and the second member are sufficiently fixed integrally by the mounting screw with positioned relative to each other. The position of the second member relative to the first member may be adjusted by fitting the positioning hole to the boss, or the position of the first member relative to the second member may be adjusted by fitting the boss into the positioning hole.

The first member and the second member have at portions or parts to be integrally fixed by the mounting screw, for example, flat plate portions which become parallel to each other in the mounted state. The boss and the tubular portion are disposed perpendicular to the flat plate portions. However, various another modes can be employed additionally. For example, one of the flat plate portions may be mounted in an inclined posture to the other flat plate portion. The boss and the tubular portion may be disposed on and fixed integrally to a deformed portion, such as bent shaped portion, wave-shaped portion, or folded portion, etc.

Length of the boss disposed on the first member is determined in the aspect to satisfactorily maintain the positioning state by fitting of the tubular portion of the second member with the boss. That is, the boss has at least the length such that the tip end thereof reaches or extends the tubular portion, in the state where the boss is fitted in the positioning hole. Thus, the boss preferably has length which reaches close to the tip end (to a position slightly below it) of the tubular portion.

The boss has for example a cylindrical shape, and the cross section of the positioning hole is made circular correspondingly. However, the cross-sectional shapes of them are determined suitably. For example, a boss of tubular shape with a rectangular cross section, and a positioning hole with a rectangular cross section, etc may be employed. The cross-sectional shapes of the boss and the positioning hole may be different, in which, for example, the boss has a cylindrical shape while the positioning hole has a rectangular cross-sectional shape.

The outer peripheral shape of the tubular portion formed the positioning hole continuously may be circular or rectangular, which can be selected suitably, regardless of the shapes of the boss and the positioning hole. For the positioning hole of the circular cross section, the inclined surface of the third aspect of the present invention is formed as a tapered surface of which diameter decreases from side of the opening at the flat facing surface, or from an axially middle portion of the positioning hole toward the tip of the tubular portion continuously.

The screw fastening hole formed in the boss may be a simple cylindrical hole, or a threaded hole having an internal thread formed on the inner circumferential surface. For the simple cylindrical hole, a tapping screw is used as the mounting screw. The head of the mounting screw engages with the tip end of the tubular portion, which includes the head directly contacts with the tip surface of the tubular portion, and the head indirectly engages therewith via a washer, etc.

On the flat facing surface of the second member, the region which needs to be formed into flat surface is determined as appropriate, in consideration of positional deviations which may occur in the process of fitting the positioning hole of the second member to the outer peripheral side of the boss. The region is determined such that the tip end of the boss is brought into contact with the flat surface, regardless of the positional deviations. A region radially outside the flat surface may have, for example, a protrusion of annular shape, etc., which is brought into contact with the first member. The flat surface is not necessarily limited to plane surface, but may include a gradually bending surface, etc., as long as the second member can be positionally adjusted by moving (sliding) it freely with contacting with the tip end of the boss.

The flat facing surface of the second member may be brought into contact with a flat surface of a plane plate, etc., of the first member, or may be brought into contact with a contacting portion i.e. an abutting portion protrudedly formed on the first member. The contacting portion is, for example, formed in an annular fashion at a periphery of the boss. However, another various modes are employed, for example, the contacting portion includes a plurality of parts divided or separated in circumferential directions. Such contacting portion may be disposed at side of the facing surface, or may be disposed on both the first member and the second member at mutually different positions or at mutually matching positions.

Height of the contacting portions thus provided can be varied according to the shapes of the first member and the second member, so that the contacted state of them can be secured readily. In this way, shape changes, etc., of the first member and the second member can accommodate with ease.

In the second aspect of the present invention, the positioning hole penetrates through the tubular portion. By screwing the mounting screw into the screw fastening hole, the head thereof engages with the tip end surface of the tubular portion to press and fix the flat facing surface against and to the first member. This mode is employed favorably when the second member is made of resin. However, when the second member is made of a metal plate material, etc., for example, a cylindrical tubular portion with a bottom and formed by drawing, etc. can be employed. A penetrating hole which allows passage of the mounting screw is formed at a bottom of the tubular portion (tip end portion of the tubular portion). An inwardly-directed flange is disposed to the tip end of the tubular potion integrally.

By screwing the mounting screw into the screw fastening hole of the boss passing through the penetrating hole, the inwardly-directed flange is sandwiched between the head of the mounting screw and the tip end surface of the boss, or between the head and tip ends of the reinforcing ribs. In this way, the second member can be fixed integrally to the first member. In this case, the facing surface of the second member is not necessarily pressed against the first member.

In the third aspect of the present invention, the inclined surface is formed on the positioning hole. However, the inclined surface or a tapered surface may instead be formed on the outer peripheral surface of the tip end portion of the boss, or it may be formed at both the positioning hole and the boss. Upon carrying out the first aspect or the second aspect of the present invention, such inclined surface or tapered surface does not have to be formed.

The reinforcing ribs of the fourth aspect of the present invention are preferably selected as small as possible in height (protruding dimension from the outer peripheral surface of the boss) within a range which can render a predetermined strength. A stepped shape of the reinforcing ribs may be employed, in which the height is small within the range of fitting inside the positioning hole, and the height is large at side of the base. In this case, the step portion formed between the two portions of different height may be used as a contacting part brought into contact with the facing surface of the second member.

Another various modes are employed, for example, in a case where the positioning hole is fitted to the boss over the entire length thereof, the reinforcing ribs of small height dimension may be disposed over the entire length of the boss. The reinforcing ribs may be disposed as necessary, and the other aspects of the present invention can be carried out with no reinforcing ribs without causing any problem.

The present invention is applied favorably in a case of mounting a predetermined mounting part to a vehicle interior part as in the fifth aspect of the present invention, but it can be applied in some fields other than vehicles as well. The first member and the second member are made, for example, of a resin material, but may instead be made of a metal other the resin. Also, different materials can be used for the first member and the second member. When both the first member and the second member are made of the resin material, the same resin material(s) does not have to be used, but the first member is made of polypropylene and the second member of is made of ABS. Another various modes can be employed.

The vehicle interior part according to the fifth aspect of the present invention is constituted, for example, of a surface material i.e. skin material in addition to the resin base member. However, it may instead be constituted of only the resin base member. The mounting part is also constituted, for example, of the skin material and the resin base member but may also be constituted of only the resin base member instead.

Examples of the vehicle interior part include such door trim-related items as door trim boards, door trim lowers (when the mounting part is a door trim upper), etc. Examples of the mounting part for such interior parts include ornaments, door pockets, arm rests, inside handle bezels, shock absorbing pads, grips, door switch units, courtesy lamps, speaker grills, service hole covers, door trim uppers, etc. Examples of door trims include front door trims, rear door trims, back door trims, slide door trims, etc.

With regard to instrument panel-related items, examples of the vehicle interior part include instrument panels, instrument panel uppers (when the mounting part is an instrument panel lower). Examples of the mounting part for such interior parts include instrument panel lowers and any of various switch units, meter periphery members, decorated panels, coin holders, etc. Besides the above, examples of the vehicle interior part include seat back boards, pillar garnishes, etc., and examples of the mounting part for such interior parts include pockets, shock cushioning members, etc.

BRIEF DESCRIPTION OF THE DRAWINGS

FIG. 2 is a view for describing another embodiment of the present invention and is a longitudinal sectional view of mounting portions corresponding to FIG. 1A;

DETAILED DESCRIPTION OF THE PREFERRED EMBODIMENTS

Embodiments of the present invention shall now be described in detail with reference to the drawings.

Figure 1A:
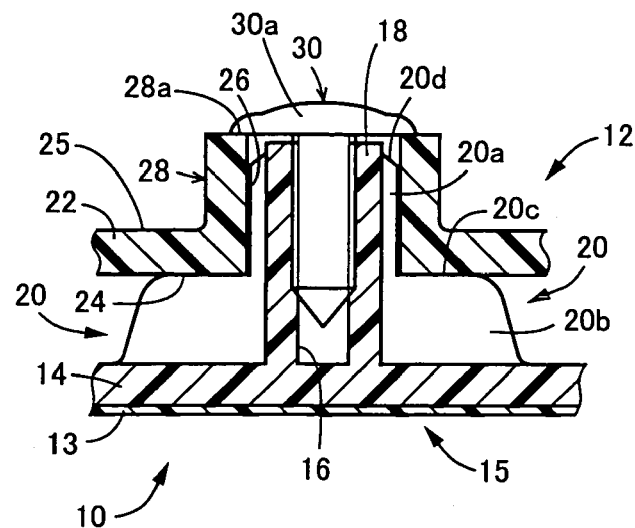
FIG. 1 shows views for describing a member mounting structure according to one embodiment of the present invention, with FIG. 1A being a longitudinal sectional view of mounting portions, FIG. 1B being a perspective view of the mounting portion at side of a vehicle interior part, and FIG. 1C being a perspective view of the mounting portion at side of a mounting part.
Figure 1B:
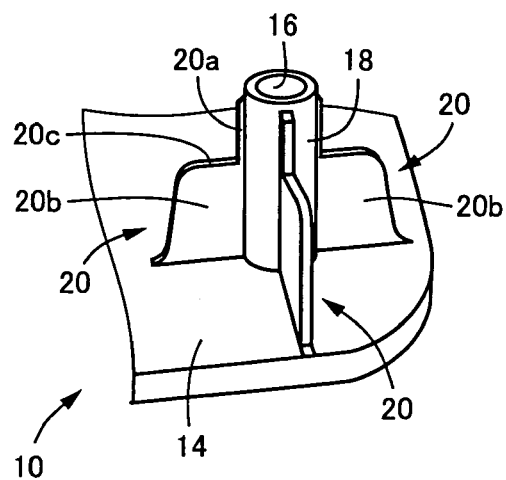
Figure 1C:
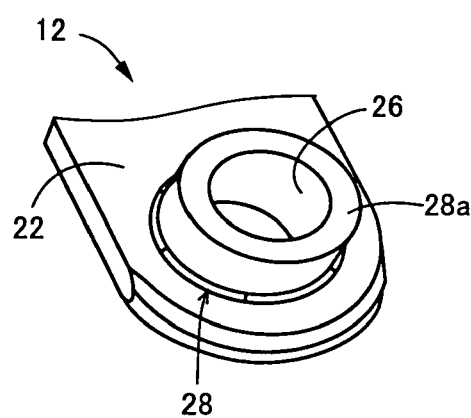

FIG. 1 shows views of one portion of a plurality of mounting portions for mounting a mounting part 12 such as an ornament, door pocket, arm rest, inside handle bezel, etc. to a vehicle interior part 10 such as door trim board, etc. FIG. 1A is a longitudinal sectional view of the mounting portion, FIG. 1B is a perspective view of the mounting portion of the vehicle interior part, and FIG. 1C is a perspective view of the mounting portion of the mounting part 12. The vehicle interior part 10 has a resin base member 14 made of polypropylene etc., and a skin material 13 is fixed to a front surface thereof integrally. A mounting portion 15 to which the mounting part 12 is fixed, is formed into a flat plane plate.

On a rear surface (upper surface in FIG. 1A) of the resin base member 14 at the mounting portion 15, a cylindrical boss 18 protruding integrally therefrom and substantially perpendicular thereto is provided. The cylindrical boss 18 has a cylindrical hole 16 formed in its center. On an outer periphery i.e. an outer peripheral surface of the boss 18, four reinforcing ribs 20 extending radially outwardly are disposed in the same intervals circumferentially at 90°. The four reinforcing ribs 20 are formed integrally with the boss 18 in axial directions.

Each reinforcing rib 20 has a small rib 20a and a large rib 20b. The small rib 20a disposed at side of a tip end than an axially middle portion of the boss 18 is small in height (protruding dimension from the outer peripheral surface of the boss 18). The large rib 20b disposed at side of a base (flat plane plate) is large in height. At a boundary between the both ribs a step 20c is disposed which is substantially perpendicular to a protruding direction of the boss 18. The boss 18 and the reinforcing ribs 20 are formed simultaneously with formation of the resin base member 14 integrally therewith. The vehicle interior part 10 corresponds to a claimed first member, and the cylindrical hole 16 corresponds to a claimed screw fastening hole.

The mounting part 12 is made of a resin material such as ABS, etc. At a mounting portion to be mounted onto the resin base member 14, a supporting portion 22 of flat plane plate is disposed integrally, which becomes substantially parallel to the resin base member 14 when it is mounted on the resin base member 14. A surface 24 of the supporting portion 22 located at a side which faces with i.e. opposes to the resin base member 14 is formed into or formed as a flat facing surface, being plane in the present embodiment. The supporting portion 22 has a circular positioning hole 26 fitted to the outer peripheral side i.e. outer peripheral surface of the boss 18 to be positioned relative to the boss 18. On a surface 25 of the mounting part 12 located at a side which is opposite to the flat facing surface 24, a cylindrical tubular portion 28 axially protruding substantially perpendicular is provided. The cylindrical tubular portion 28 has a positioning hole 26 axially penetrating therethrough, continuous to the positioning hole 26 of the supporting portion 22.

In the present embodiment, the mounting part 12 is mounted onto the resin base member 14 such that its positioning hole 26 is fitted to the outer periphery of the small rib portions 20a, and its facing surface 24 contacts with the steps 20c. The steps 20c function as an abutting portions i.e. contacting portions. Tip ends of the small rib portions 20a in the protruding direction of the boss 18 are formed into inclined surfaces 20d which retract axially as they are distant away radially from the boss 18. The mounting part 12 corresponds to a claimed second member. The tubular portion 28 is formed simultaneously with molding of the mounting part 12 integrally therewith.

The tubular portion 28 has an axial length such that its upper end axially protrudes slightly upwardly from an upper end of the boss 18, with the boss 18 and the small rib portions 20a fitted into the positioning hole 26, and with the facing surface 24 contacted with the steps 20c. In the state where the boss 18 is thus fitted into the positioning hole 26 of the tubular portion 28, a mounting screw (a tapping screw into the present embodiment) 30 is screwed into the cylindrical hole 16 of the boss 18. Upon screwing into the cylindrical hole 16, the mounting screw 30 taps an internal thread on an inner circumferential surface thereof, so that a head 30a of the mounting screw 30 is brought into contact with a tip end surface 28a of the tubular portion 28. At the same time, pressing the facing surface 24 against the steps 20c resulted from the screw-into of the mounting screw 30, fixes the supporting portion 22 of the mounting part 12 integrally to the resin base member 14 of the vehicle interior part 10. The head 30a of the mounting screw 30 larger than the positioning hole 26 in diameter, is brought into engagement with (seated on) the tip end surface 28a of the tubular portion 28.

In the above-mentioned mounting structure, the mounting part 12 is provided with the positioning hole 26 fitted to the outer peripheral side i.e. surface of the boss 18 to be positioned relative thereto. The facing surface 24 of the mounting part 12 is formed into a flat plane surface. Thus, by performing the positional alignment (positional adjustment) with the facing surface 24 slidably-contacted with the tip end of the boss 18, the positioning hole 26 can be fitted and positioned readily relative to the boss 18.

A region of the facing surface 24 which needs to be flat is determined as appropriate in consideration of positional deviations which may occur in the fitting process of the positioning hole 26 to the outer peripheral surface of the boss 18 such that the tip end of the boss 18 is contacted with the plane surface, regardless of the positional deviation. In the present embodiment, the abutting region of the facing surface 24 contacted with the steps 20c is required to be flat.

On the surface 25 of the mounting part 12 located at the side which is opposite to the facing surface 24, the tubular portion 28 is disposed to be fitted to the boss 18 substantially over its entire axial length. Good positioned state of the mounting part 12 is maintained by the fitting of the tubular portion 28 to the boss 18. Thus, the fastening work upon screwing the mounting screw 30 into the cylindrical hole 16 of the boss 18 for fixing the mounting part 12 to the vehicle interior part 10 integrally can performed readily and rapidly.

Thus, the positional alignment (positional adjustment) of the mounting part 12 relative to the vehicle interior part 10 can be performed readily, and the fastening work of the mounting screw 30 can be performed readily. Accordingly, the mounting work of the mounting part 12 to the vehicle interior part 10 can be automated.

Meanwhile, due to mutual fitting between the boss 18 and the tubular portion 28 over the predetermined axial length, the mounting screw 30 can hardly be fastened with the mounting part 12 ridden on the boss 18. Consequently, the defective production is prevented to improve the yield. In addition, as long as the boss 18 is partially positioned within the positioning hole 26, the tubular portion 28 becomes perfectly fitted to the boss 18, as the mounting screw 30 is fastened to be fixed at the predetermined position. In this way, a high mounting position precision (alignment quality) is always obtained regardless of deformation, positional deviation etc. of the respective portions.

In the present embodiment, the positioning hole 26 is formed to penetrate through the tubular portion 28. In addition, with the tubular portion 28 fitted to the boss 18, the facing surface 24 is brought into contact with the steps 20c of the reinforcing ribs 20. By screwing the mounting screw 30 into the cylindrical hole 16 of the boss 18 in this state, the head 30a of the mounting screw 30 engages with the tip end surface 28a of the tubular portion 28, so that the facing surface 24 is pressed against and fixed to the steps 20c. Thus, visual recognition of the cylindrical hole 16 is easy, which facilitates the fastening work of the mounting screw 30 more readily. Also, the mounting part 12 of simple structure can be arranged inexpensively and can be favorably made of the resin material.

Figure 5A:
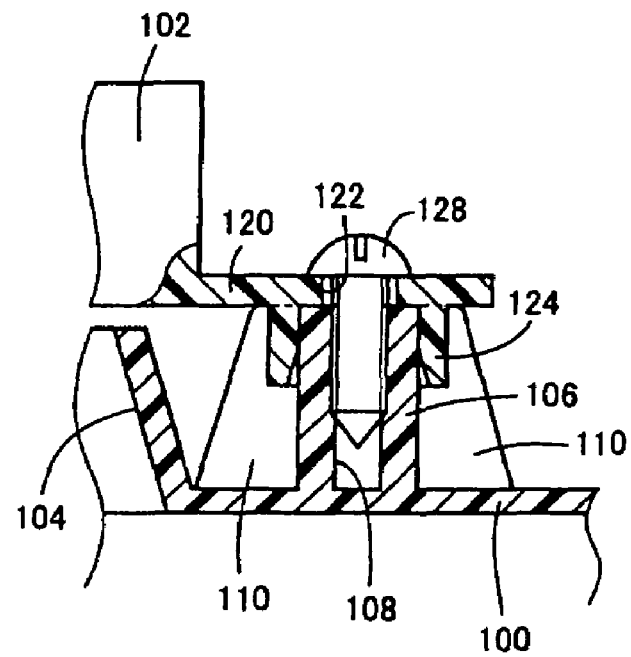
FIG. 5 shows views for describing an example of a conventional member mounting structure, with FIG. 5A being a longitudinal sectional view of mounting portions, and FIG. 5B being a perspective view of a positioning tubular portion disposed on a supporting portion of a clock.
Figure 5B:
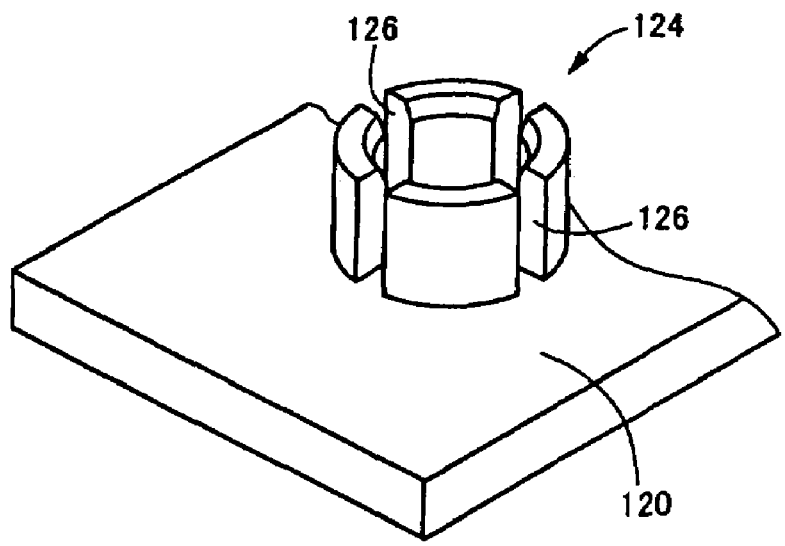
Figure 6:
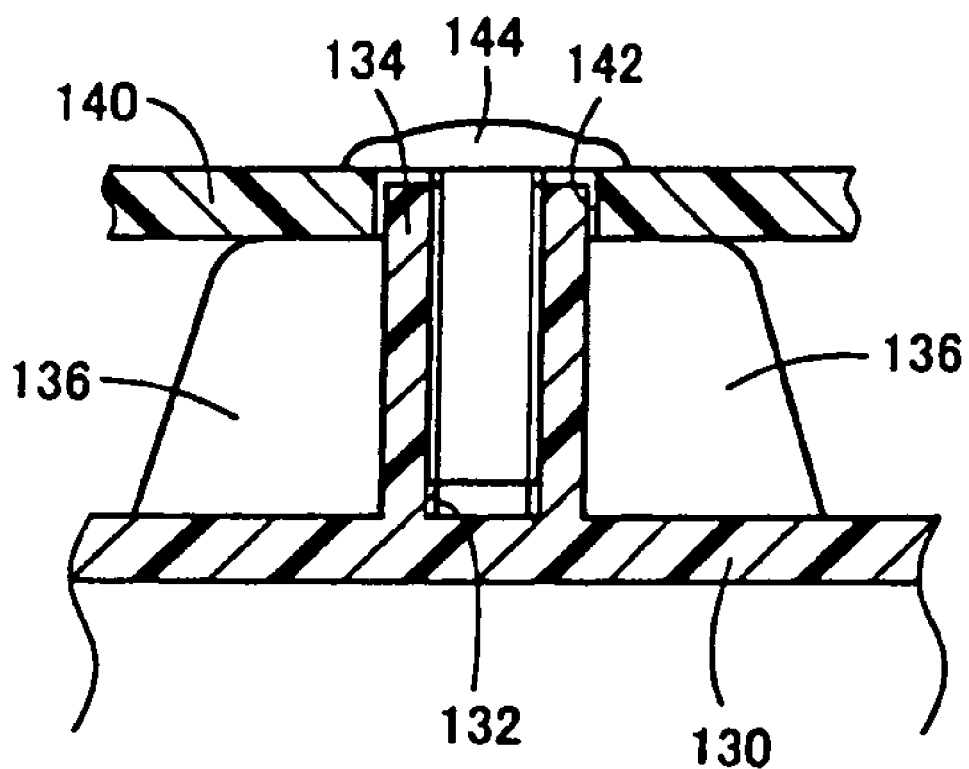
FIG. 6 is a diagram for describing another example of a conventional member mounting structure and is a longitudinal sectional view of mounting portions.

In the present embodiment, the plurality of reinforcing ribs 20 are disposed axially on the outer peripheral surface of the boss 18. However, the reinforcing ribs 20 have the small rib portions 20a which are small in height, and the tubular portion 28 is fitted to the outer peripheral surfaces thereof. For this reason, alignment of slits which is necessary in the conventional art show in FIG. 5 is not necessary i.e. can be omitted, so that the positioning hole 26 can be fitted readily relative to the boss 18 to be positioned relative thereto, regardless of the presence/absence of the reinforcing ribs 20. In addition, the reinforcing ribs 20 contributes to secure a predetermined strength of the boss 18, the positioning hole 26 and therearound.

At the tip end of the small rib portion 20a, the inclined surface 20d is disposed so as to retract axially as it is distant away radially from the boss 18. Thus, in the fitting process of the positioning hole 26 to the outer peripheral surfaces of the small rib portions 20a, the aligning work is facilitated further.

In addition, with the play existed between the small rib portions 20a and the positioning hole 26 small, alignment of them can be performed at high precision. In this way, the mounting positioning precision of the mounting part 12 relative to the vehicle interior part 10 can be improved further.

Another embodiment of the present invention shall now be described. In the following description, portions which are substantially common in the structure etc. to that in the above-described embodiment shall be provided with the same references, and detailed description thereof shall be omitted.

A mounting structure shown in FIG. 2 differs from the embodiment shown in FIG. 1 in that a tapered surface 40 is disposed at an opening of the positioning hole 26 at side of the facing surface 24. A diameter of the tapered surface 40 decreases toward the interior, that is, toward the tip end of the tubular portion 28. Thus, the inner wall surface of the positioning hole 26 inclines toward the inner side (central side).

In this case, the inclination of the tapered surface 40 increases an opening area of the positioning hole 26. Thus, together with the inclination of the inclined surfaces 20d at the tip ends of the small rib portions 20a, the aligning work of the positioning hole 26 with the small rib parts 20a during fitting thereof is facilitated further. In addition, by selecting the play existed between the small rib portions 20a and the positioning hole 26 to be small, the alignment of them can be performed at high precision, so that the mounting positioning precision of the mounting part 12 relative to the vehicle interior part 10 can be improved further. The tapered surface 40 corresponds to a claimed inclined surface.

In the embodiment shown in FIG. 2, the large rib portions 20b of the reinforcing ribs 20 is selected lower in height (axial length of the boss 18), in comparison to that in the above-described embodiment. This increases length of the tubular portion 28, and thereby increases the fitting length with the boss 18. In this way, the positioned state is maintained suitably by fitting between the tubular portion 28 and the boss 18, so that the fastening work during screwing of the mounting screw 30 into the cylindrical hole 16 of the boss 18 can be performed more readily.

In correspondence to the lengthened axial length of the tubular portion 28, length of the small rib portions 20a is also axially lengthened, which shortens axial length of the large rib portions 20b correspondingly. However, because strength of the large rib portions 20b increases correspondingly, the mounting strength of the mounting part 12 which is fixed with pressed against the steps 20c of the large rib portions 20b can be increased further.

Figure 3A:
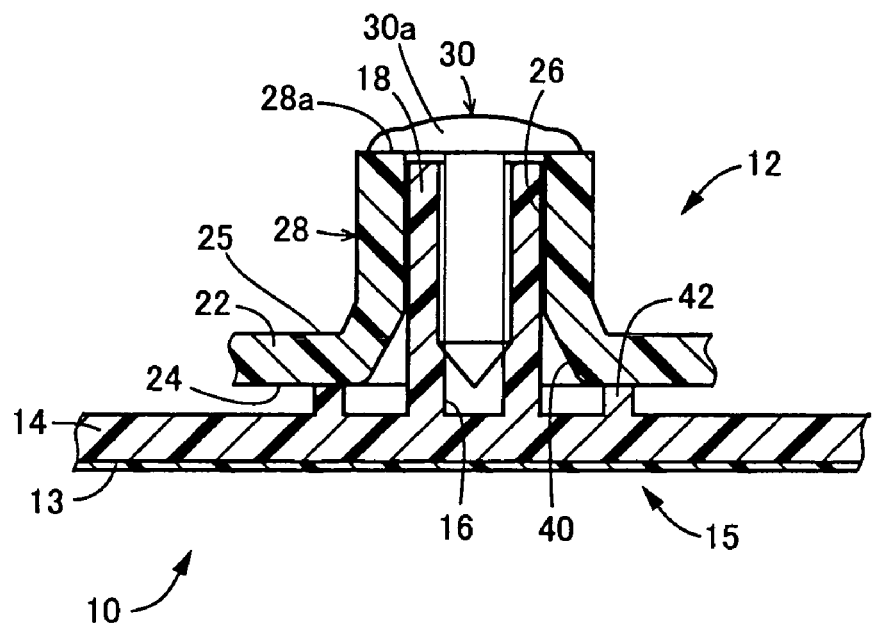
FIG. 3 shows views for describing another embodiment of the present invention and are longitudinal sectional views of mounting portions corresponding to FIG. 1A, with FIG. 3A showing a case where the mounting portion of a vehicle interior part is a flat plane plate, and FIG. 3B showing a case where the shape of the mounting portion of the vehicle interior part is deformed.

A mounting structure shown in FIG. 3A differs from the mounting structure shown in FIG. 2 in the following points. That is, with the reinforcing ribs 20 eliminated, the positioning hole 26 is fitted directly to the boss 18. In addition, an abutting portion i.e. a contacting portion 42 is disposed integral with the resin base member 14 at the periphery of the boss 18. The contacting portion 42 has an annular shape, or includes a plurality of parts divided in the circumferential direction. The facing surface 24 of the mounting part 12 is brought into contact with the contacting portion 42.

Figure 3B:
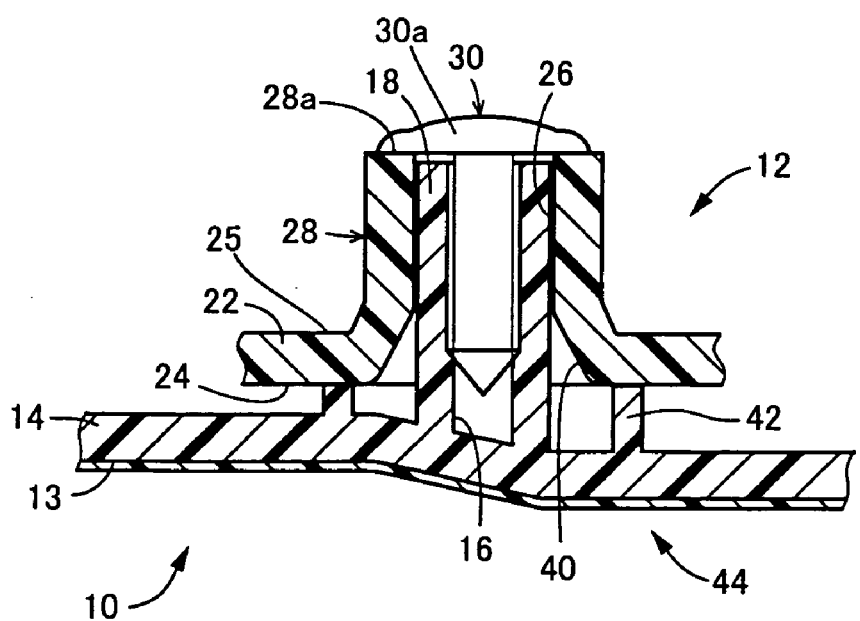

In this case, elimination of the reinforcing ribs 20 suppresses occurrence of a sink mark, which improves the resin base member 14 in its appearance quality. Also, even when the mounting portion 44 of the vehicle interior part 10 deforms as shown in FIG. 3B, varying height of the contacting portion 42 according to the shape can secure the contacting state of them readily. In this way, the mounting structure can accommodate shape change etc. of the vehicle interior part 10 readily. If the sink mark occurs in the appearance even when the contacting portion 42 is disposed integrally on the resin base member 14, the contacting portion 42 may be disposed integrally on the mounting part 12.

Figure 4A:
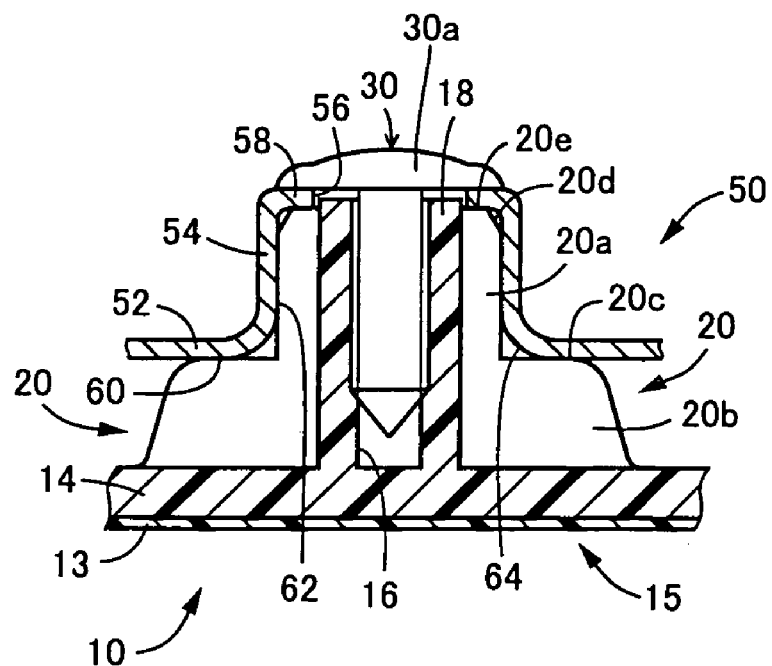
FIG. 4 shows views for describing yet another embodiment of the present invention, with FIG. 4A being a longitudinal sectional view of mounting portions, and FIG. 4B being a perspective view of the mounting portion of a bracket which is a second member.
Figure 4B:
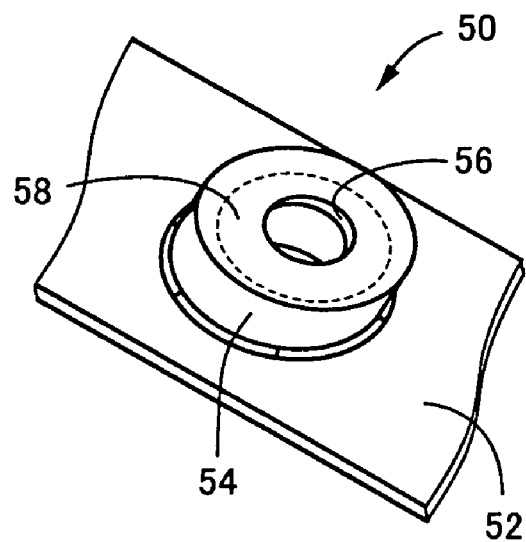

In a mounting structure shown in FIG. 4, the second member is comprised of a bracket 50 made of a metal plate. At a flat supporting portion 52 of the bracket 50, a tubular portion 54 of a cylindrical shape with a bottom is formed by drawing. Also, a penetrating hole 56 of a diameter larger than that of the boss 18 is formed at a bottom (tip of the tubular portion 54), to form an inwardly-directed flange 58 integrally at the tip end of the tubular portion 54.

Meanwhile, a tip end surface 20e in the axial direction of the small rib 20a of the reinforcing rib 20 is formed into a flat plane surface perpendicular to the protruding direction of the boss 18, with which the inwardly-directed flange 58 of the tubular portion 54 fitted to the boss 18 is contacted. When the mounting screw 30 is screwed into the cylindrical hole 16 of the boss 18 in this state, the inwardly-directed flange 58 is sandwiched i.e. nipped between the head 30a of the mounting screw 30 and the tip end surfaces 20e of the reinforcing ribs 20. Thus, the bracket 50 and the vehicle interior part 10 are fixed integrally.

In the present embodiment, the plane surface 60 of the supporting portion 52 at the side facing with the resin base member 14 functions as the flat facing surface. By performing the positional alignment (positional adjustment) with the flat surface 60 slidably-contacting with the tip end of the boss 18, the tubular portion 54 can be fitted readily to the outer peripheral surfaces of the small rib portions 20a to be positioned relative thereto. In the present embodiment, the same operations and effects as that of the above-described embodiments are obtained as well.

An inner peripheral surface 62 of the tubular portion 54 corresponds to a claimed positioning hole. An inner diameter or a bore diameter of the tubular portion 54 is selected to be the same as or slightly larger than the diameter of the small rib portions 20a. Also, a base end portion of the tubular portion 54, that is, a portion which is connected to the supporting portion 52 is bent at a comparatively large radius. A bent surface 64 formed at a side i.e. area where the base end portion continues to the plane surface 60, functions as an inclined surface, so that the aligning work during fitting of the tubular portion 54 to the small rib portions 20a is facilitated further. In the present embodiment, the plane surface 60 is not necessarily pressed against the steps 20c, that is there may exist a predetermined gap therebetween.

Heretofore, some embodiments of the present invention were described in detail based on the drawings above. Noted that these are no more than illustrations. The present invention can be carried out in another modes in which various changes and modifications are applied based on the knowledge of those skilled in the art.

What is claimed is:

1. A member mounting structure comprising:
   a first member comprising a base portion having a tubular boss extending from the base portion with a screw fastening hole axially extending through a center thereof, and a plurality of axially extending reinforcing ribs disposed on an outer peripheral surface of the boss, each of the reinforcing ribs including a first rib portion disposed proximate the boss, a second rib portion disposed proximate a side of the base portion, and a step portion defined between the first rib portion and the second rib portion;
   a second member positioned relative to a first member, the second member comprising a supporting portion having, at a side facing the first member, a flat facing surface having a positioning hole extending axially therethrough, and having on a surface, opposite to the flat facing surface, a tubular portion extending axially from the supporting portion with the positioning hole axially extending through the flat facing surface and the tubular portion;
   wherein the second member is mounted on the first member such that the first rib portions of the reinforcing ribs extend into the positioning hole between the tubular portion and the outer peripheral surface of the boss and the flat facing surface of the supporting portion contacts the step portions of the reinforcing ribs; and
   a mounting screw screwed into the screw fastening hole of the boss, wherein when the boss is fitted within the positioning hole, the mounting screw is screwed into the screw fastening hole such that a head of the mounting screw engages a tip end of the tubular portion and the flat facing surface of the supporting portion is pressed against the step portions of the reinforcing ribs so that the second member is integrally fixed against and to the first member.

2. The member mounting structure according to claim 1, wherein:
   the positioning hole has an inclined surface of which an inner wall surface is inclined toward a center line as it goes from a side of the flat facing surface to a side of the tip end of the tubular portion.

3. The member mounting structure according to claim 1, wherein:
   the first member is a vehicle interior part having a resin base member, from a rear surface of which the boss is axially protruded integrally, and
   the second member is a mounting part made of resin to be mounted to the vehicle interior part from which the tubular portion is axially protruded integrally.

4. The member mounting structure according to claim 1, wherein the tubular portion is axially protruded from the boss.

5. The member mounting structure according to claim 4, wherein:
   the positioning hole has an inclined surface of which an inner wall surface is inclined toward a center line as it goes from a side of the flat facing surface to a side of the tip end of the tubular portion.

6. The member mounting structure according to claim 4, wherein:
   the first member is a vehicle interior part having a resin base member, from a rear surface of which the boss is axially protruded integrally, and
   the second member is a mounting part made of resin to be mounted to the vehicle interior part from which the tubular portion is axially protruded integrally.

7. The member mounting structure according to claim 1, wherein the supporting portion of the second member is substantially parallel to the base portion of the first member, and the tubular portion projects perpendicularly form the supporting portion.

* * * * *